Oct. 14, 1958 A. W. POLLOCK 2,856,444
SEPARATION OF AROMATIC FROM SATURATE HYDROCARBONS
Filed April 13, 1956 2 Sheets-Sheet 2

INVENTOR.
ANDRE W. POLLOCK
BY
ATTORNEY

2,856,444
SEPARATION OF AROMATIC FROM SATURATE HYDROCARBONS

Andre W. Pollock, Swarthmore, Pa., assignor to Sun Oil Company, Philadelphia, Pa., a corporation of New Jersey Application April 13, 1956, Serial No. 578,033

2 Claims. (Cl. 260—674)

This invention relates to the separation of aromatic hydrocarbons from mixtures of aromatic and saturated hydrocarbons, and relates more particularly to aromatic separation by adsorption techniques.

Cyclic processes for the separation of aromatics from hydrocarbon fractions such as gasoline reformates by selective adsorption on adsorbent material such as silica gel, charcoal, or the like, on which aromatics are selectively adsorbed, have been known for some time. In such processes, during the first portion of the cycle, the feed is percolated through the adsorbent until its capacity for feed aromatics is substantially exhausted. At this time, flow of feed is cut off, and, during the second portion of the cycle, a liquid capable of desorbing the feed aromatics is passed through the adsorbent until they have been substantially completely removed, after which passage of feed over the adsorbent is resumed. The effluent from the adsorbent is collected in two cuts, and is subjected to distillation to separate feed components and desorbent components. The first cut will comprise feed saturates, together with desorbent left on the gel from the previous desorption portion of the cycle, and second cut will comprise feed aromatics, together with desorbent.

In one system using liquid desorbent for recovery of feed aromatics, a saturated hydrocarbon boiling outside the boiling range of the feed and commonly called "push liquid," is first passed through the absorbent until substantially all feed saturates have been dislodged from the interstitial spaces of the adsorbent. During this time, the effluent will be collected as a portion of cut 1. Since the feed aromatics are more strongly adsorbed than saturates, the saturated material will displace very little of the feed aromatics from the adsorbent, although some desorption of feed aromatics will occur, since adsorption is an equilibrium phenomenon, and a very small amount of feed aromatics may appear in the effluent before removal of feed saturates is complete.

As the displacement of feed saturates from the adsorbent nears completion, as evidenced by their decreasing concentration in the effluent, flow of the saturated desorbent component is cut off, and an aromatic liquid, which boils outside the boiling range of either the feed or the saturate, and which is capable of desorbing feed aromatics from the adsorbent, is passed through the adsorbent until substantially all feed aromatics have been removed therefrom. During this portion of the cycle, the effluent is collected in the second cut, and will comprise feed aromatics displaced from the adsorbent by the aromatic desorbent component, desorbent saturates, and some desorbent aromatics, which will form a greater and greater portion of the effluent as the desorption approaches completion.

As desorption of feed aromatics approaches completion, flow of aromatic desorbent to the adsorbent is discontinued, and fresh feed is passed to the adsorbent, the effluent continuing to be collected in cut 2 until no feed aromatics appear in the effluent, at which time the flow of effluent is switched to the receiver in which cut 1 is collected. Flow of feed is continued until the capacity of the adsorbent for feed aromatics is substantially exhausted, at which time flow of feed is cut off, and the saturate desorbent component is passed to the adsorbent as described above.

Cuts 1 and 2 of the effluent are then separately subjected to distillation to recover feed saturates and desorbent components from cut 1 and feed aromatics and desorbent components from cut 2. The desorbent components are then separated into "push liquid" and aromatic desorbent by distillation. Alternatively, if the aromatic desorbent is higher boiling than the feed, and the "push liquid" is lower boiling, each cut may be subjected to distillation to take overhead "push liquid," followed by a separate fractionation to recover feed components and aromatic desorbent. By proceeding in this manner, feed aromatics having a purity of over 99.5% may be recovered in almost quantitative yield, but the system has the disadvantage that two distillation towers are required for processing each effluent cut, since the "push liquid" must be separated from the aromatic desorbent.

Another system for recovering aromatics from the adsorbent uses a desorbing liquid which is a mixture of aromatics and saturates boiling in the same boiling range, but outside the boiling range of the feed. The proportion of aromatics to saturates in the desorbing liquid may vary widely, but generally speaking, the optimum proportions should be from 30% to 40% aromatics and from 60% to 70% saturates.

When using mixed desorbent, feed is passed over the adsorbent until its capacity for feed aromatics is substantially exhausted, then the desorbent is passed through the adsorbent until the feed aromatics are substantially completely displaced from the adsorbent, after which flow of feed through the adsorbent is resumed. As in the preceding case, the effluent is divided into a first cut rich in feed saturates, and a second cut rich in feed aromatics. These cuts are distilled to recover feed aromatics, feed saturates and mixed desorbent, which is taken to storage for recycle to the process.

In passing through the bed of adsorbent, desorbent aromatics will tend to be adsorbed, while the desorbent saturates will pass through relatively unadsorbed, to provide a wedge of desorbent substantially depleted in aromatics in advance of the main body of adsorbent. This wedge serves the same purpose as the "push liquid" described above, but since it will always contain some desorbent aromatics which tend to desorb feed aromatics at the crucial interface where desorbent follows charge, the tail end of cut 1 containing the feed saturates will be somewhat more contaminated with feed aromatics than in the case where the "push liquid" is used. This causes a decrease in the yield of aromatics, if the cut point between cuts 1 and 2 is such that aromatics of the same purity as recovered in "push liquid" operation are to be recovered from cut 2, or a decrease in aromatic purity if the cut point is so selected as to yield the same recovery of feed aromatics. Mixed desorbent operation does have the advantage, however, of somewhat lower capital and operating cost, since but one tower is required for separation of the feed components and desorbent, there being no necessity for separating the desorbent into aromatic and saturate fractions. An example of an adsorption process using mixed desorbent is the Arosorb process described in Petroleum Refiner, vol. 31, No. 5, pages 109–113 (May 1952 issue).

It is an object of this invention to provide a process which retains the low investment and processing costs of a mixed desorbent operation, while obtaining the yields and purity of "push liquid" operation.

I have found that this object may be readily attained by initially, during start-up of the process, charging feed and mixed desorbent to the process as described above. After the first cycle of operation, however, the recovered desorbent is not mixed and recycled to the process as in the Arosorb process referred to above, but the desorbent separated from feed aromatics is segregated, as is the desorbent separated from the feed saturates. In the second and succeeding cycles, the feed is followed by desorbent separated from the feed aromatics, which, in turn is followed by desorbent separated from the feed saturates. It will be found that the precess will soon arrive at a steady state in which the desorbent separated from the feed aromatics is more paraffinic than the desorbent originally charged to the process, while the desorbent separated from the feed saturates is more aromatic than the original desorbent. For example, in processing a reformate for the recovery of benzene and toluene, if the original desorbent contained 40% xylenes, the balance being $C_8$ and $C_9$ paraffins, after a short while it will be found that the desorbent mixture recovered from feed aromatics contains but 28% xylenes, while that recovered from the feed saturates will contain about 58% xylenes. Thus, by segregating the two desorbent streams, and feeding them to the adsorbent in the order named, it is possible to first treat the adsorbent containing adsorbed feed aromatics with a low-aromatic desorbent which is effective to push out feed saturates while desorbing a minimum of feed aromatics, whereby to minimize contamination of the tail end of the feed saturate-containing effluent cut, and then to treat the adsorbent with a high aromatic desorbent which is far more efficient in desorbing feed aromatics than a desorbent of the constitution of the original desorbent.

In order that those skilled in the art may more fully appreciate the nature of my invention and the method of carrying it out, an example thereof will be more fully described in connection with the accompanying drawing in which.

Figure 1:
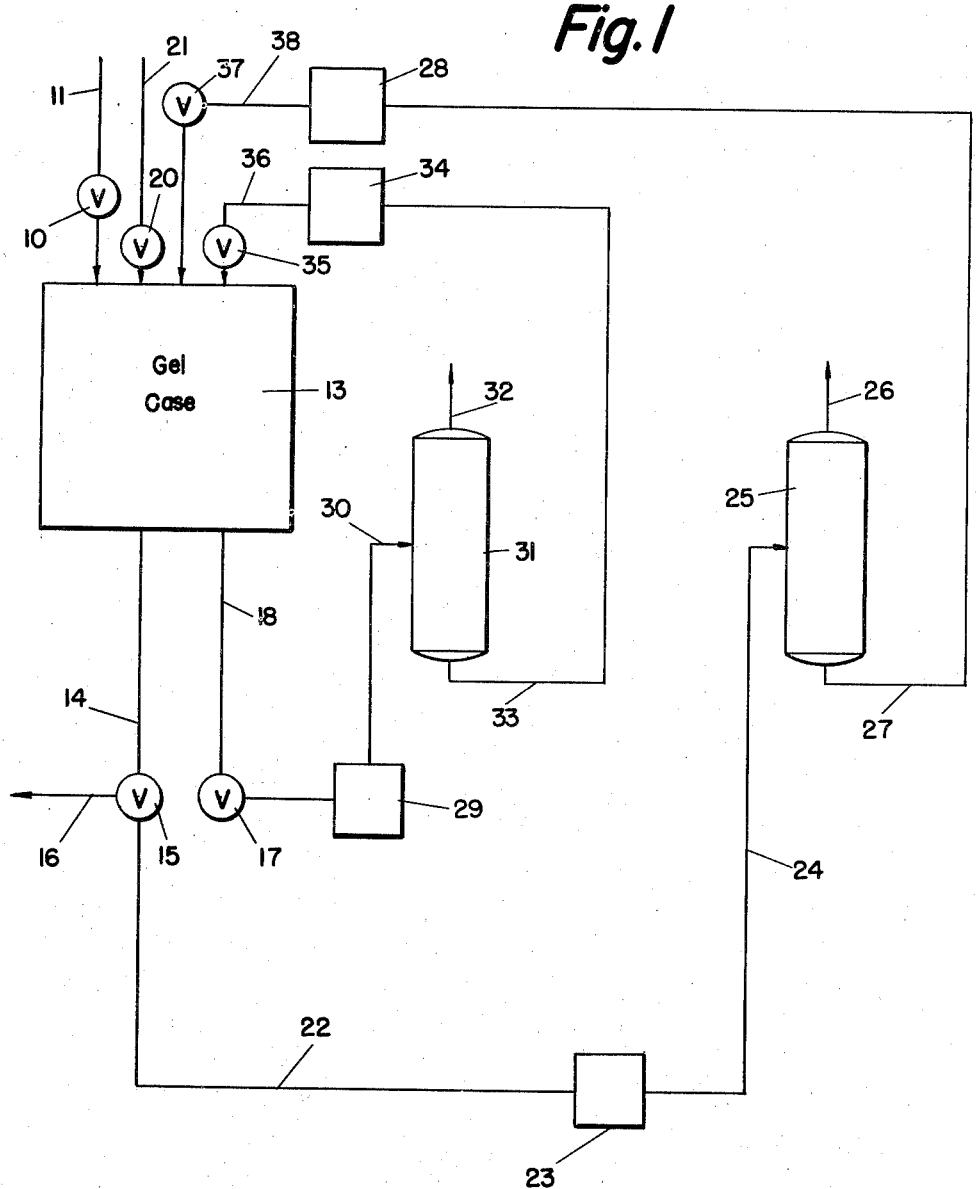
Fig. 1 is a diagrammatic flow sheet of the process.

Referring now more particularly to Fig. 1, in starting up the process, valve 10 in feed line 11 is opened and a feed, derived from Houdriforming a 150°–225° F. straight run naphtha and which contains about 40% by volume benzene and toluene, is passed through adsorber case 13, which is packed with silica gel, until the amount of feed aromatics charged to the case equals about 65% of the capacity of the gel for feed aromatics. During this time, effluent, which consists almost entirely of feed saturates, is taken off through line 14, valve 15 and line 16 to storage, valve 17 in line 18 being closed at this time. Valve 10 is now closed and valve 20 in line 21 is opened, and desorbent, which is composed of about 40% xylenes and 60% saturated $C_8$ and $C_9$ hydrocarbons, is passed to case 13 through line 21. At this time, valve 15 is shifted to divert effluent through line 22 to intermediate storage 23, from which it is continuously passed through line 24 to fractionating tower 25. Feed saturates are taken off overhead from tower 25 through line 26 for disposal or for further processing, while any desorbent components present in the feed to tower 25 are taken off as bottoms through line 27 and are passed to storage 28.

Operation is continued in this manner until feed aromatics begin to show up in the effluent from case 13, at which time valve 15 is closed, and valve 17 is opened so as to pass effluent through line 18 to intermediate storage 29, from which it is continuously withdrawn and passed to fractionating tower 31 through line 30. Feed aromatics are taken overhead from tower 31 through line 32, while desorbent is taken off as bottoms through line 33 and passed to storage 34.

After feed aromatics have been substantially desorbed from the adsorbent, valve 20 will be closed and valve 10 will be opened to allow feed to pass through line 11 to case 13. Valve 17 will remain open until feed aromatics disappear from the effluent, at which time, it will be closed and 15 will be opened to pass effluent through lines 14 and 22 to storage 23. When the amount of feed aromatics charged to the case equals a certain percentage of the capacity of the gel for feed aromatics, say 65%, valve 10 will be closed, and valve 35 will be opened to allow desorbent to flow from storage 34 through line 36 to case 13, in an amount equal to that recovered from the effluent flowing to storage 29 during the preceding cycle. Valve 35 is then closed, and valve 37 is opened to allow desorbent to pass from storage 28 to case 13 through line 38 in an amount equal to that recovered from the effluent flowing to storage 23 during the preceding cycle, after which valve 37 will be closed. During the second cycle of operation, the system will not contain sufficient desorbent to completely desorb feed aromatics so that additional desorbent should be admitted through line 21 and valve 20 to complete the desorption. In succeeding cycles of operation, however, sufficient adsorbent will be available from storages 23 and 28 to complete the desorption so that valve 10 may be opened to admit feed to case 13 immediately upon the closing of valve 37.

It will be understood that during the second and succeeding cycles of operation, valve 15 will be open and valve 17 will be closed so that effluent may be passed to storage 23 during that part of the cycle during which the effluent is essentially free of feed aromatics, and that valve 15 will be closed and valve 17 opened during that part of the cycle in which the effluent is essentially free of feed saturates.

Figure 3:
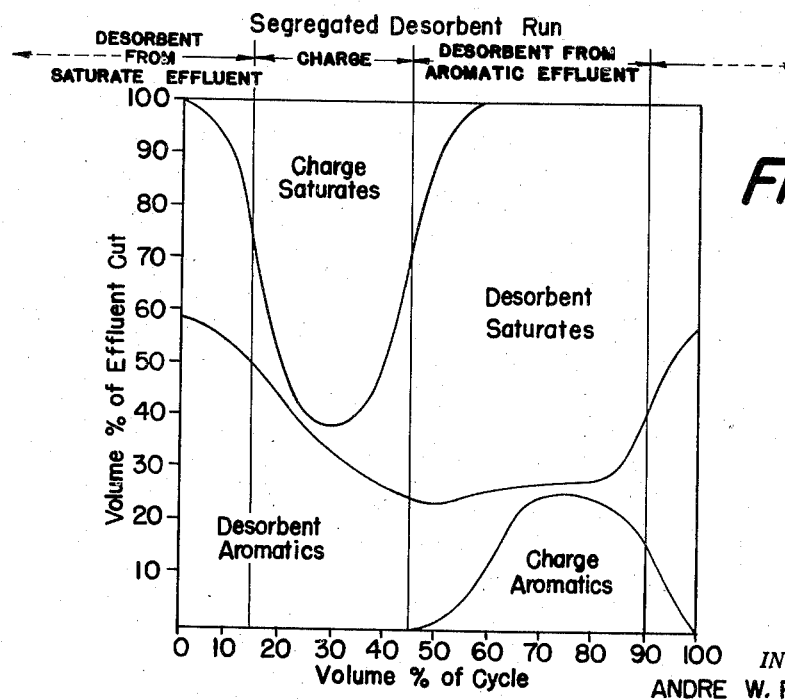
Fig. 3 is a cycle analysis showing the composition of the effluent from the adsorbent during each part of the cycle when proceeding according to the present invention.

After the process has been on stream for a few cycles, the composition of the effluent during each cycle (considering the cycle to begin with the opening of valve 15) will approach that shown in Fig. 3. As may be observed, at the start of the cycle, the effluent will consist entirely of desorbent components left in the adsorbent from the previous cycle. The percentage of feed saturates will gradually build up as the cycle progresses, and then will diminish until they disappear at about 57% of the cycle. During this time, the desorbent portion of the effluent will be rich in aromatics, since the feed aromatics are desorbing the desorbent aromatics and pushing them down through case 13, so that in the instance illustrated, desorbent recovered from tower 25 will contain about 58% aromatics.

Figure 2:
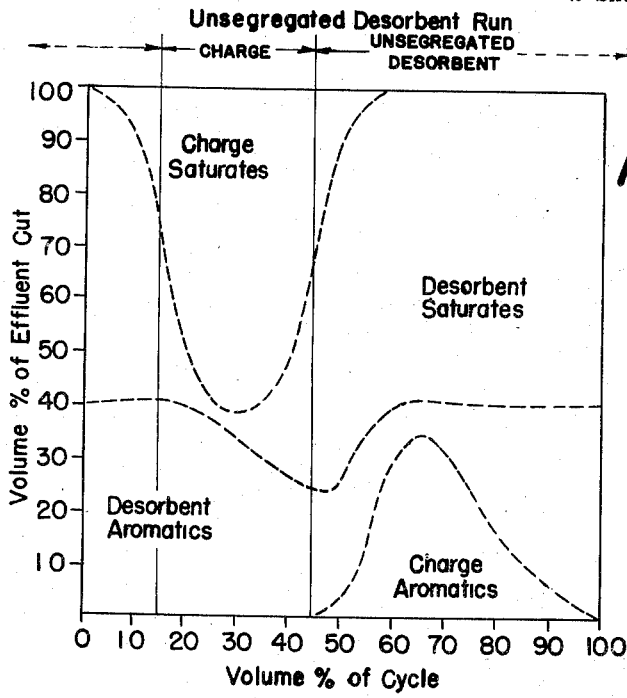
Fig. 2 is a cycle analysis showing the composition of the effluent from the adsorbent during each part of each cycle of operation using mixed desorbent of uniform composition throughout the cycle.

Feed aromatics appear in the effluent just prior to the disappearance of the feed saturates. If aromatics of highest purity are desired, valve 15 should be closed and valve 17 opened only when all feed saturates have been eliminated from the effluent. Conversely, if high yield of aromatics is desired, but high purity is not essential, valves 15 and 17 should be operated when feed aromatics first appear in the effluent. It will be noted that during the portion of the cycle in which feed aromatics appear in the effluent, the desorbent portion of the effluent is relatively poor in aromatics since the desorbent aromatics have displaced feed aromatics from the gel and have been in turn adsorbed thereon. In the instance illustrated, the desorbent recovered from tower 31 will contain about 28% aromatics. As may be noted from a comparison of Figs. 2 and 3, when operating in accordance with the conventional Arosorb process, if valve 17 is opened at 55% of the cycle, aromatics of 99+% purity may be obtained in a yield of about 93% yield, whereas, when proceeding according to the present invention, if the cut is made at the same point, aromatics of 99+% purity may be recovered in better than 97% yield.

It will then be apparent that in the operation of an adsorption process according to the present invention, it is possible to desorb feed aromatics from an adsorbent by the use of two desorbents of differing degrees of aromaticity recovered from later stages of the process in condition for immediate reuse. By first contacting the adsorbent with the desorbent of lower aromaticity, feed saturates may be displaced from the interstitial spaces and pores of the adsorbent with a minimum displacement of feed aromatics, and use of the desorbent of higher aromaticity as the second adsorbent assures essentially complete desorption of feed aromatics from the adsorbent with a minimum volume of desorbent. By so proceeding, a higher yield of high purity aromatics or saturates, as the case may be, may be obtained than when proceeding according to the processes of the prior art, while retaining the Arosorb advantages of minimum distillation cost.

I claim:

1. In a cyclic process for the separation of hydrocarbon mixtures into aromatic and saturate fractions in which during each cycle a feed stock comprising aromatic and saturate hydrocarbons is passed through a bed of adsorbent material on which aromatics are more strongly adsorbed than saturates until the capacity of the adsorbent for feed aromatics is substantially exhausted, after which a desorbent hydrocarbon stream comprising saturated and aromatic hydrocarbons boiling outside the boiling range of the feed stock is passed through the adsorbent until the feed components have been displaced therefrom; in which the effluent from the adsorbent during each cycle is collected in two separate fractions, one substantially free of feed saturates and the other substantially free of feed aromatics; and in which each effluent cut is separately distilled to recover feed components and desorbent, the improvement which comprises passing through the adsorbent, during each cycle, feed and desorbent components in the following order; first, fresh feed in an amount sufficient to substantially exhaust the capacity of the adsorbent for feed aromatics, second, desorbent separated from the effluent substantially free of feed saturates recovered from previous cycles of operation, the amount of desorbent being equivalent to that contained in the effluent of similar type recovered during the preceding cycle and, third, desorbent separated from the effluent substantially free of feed aromatics recovered from previous cycles of operation, the amount of desorbent being equivalent to that contained in the effluent of similar type recovered during the preceding cycle.

2. The process according to claim 1 in which the adsorbent is silica gel.

References Cited in the file of this patent

UNITED STATES PATENTS

| 2,441,372 | Hirschler et al. | May 18, 1949 |
| 2,576,525 | Lipkin | Nov. 27, 1951 |

OTHER REFERENCES

Guthrie: Petroleum Processing, pages 833–835, August 1951, vol. 6, No. 8.